United States Patent [19]

Frochaux et al.

[11] 3,960,239

[45] June 1, 1976

[54] NOISE-REDUCING FLUID-FLOW DEVICES

[75] Inventors: Alain Frochaux, Boston; Charles M. Salerno, Wayland, both of Mass.

[73] Assignee: Barry Wright Corporation, Watertown, Mass.

[22] Filed: Aug. 15, 1973

[21] Appl. No.: 388,636

[52] U.S. Cl................ 181/49; 181/36 A; 181/60; 181/71; 138/40; 29/157 R; 181/35 C
[51] Int. Cl.²............... F01N 1/10; B21D 53/00
[58] Field of Search............ 181/35 A, 35 C, 36 A, 181/36 B, 49, 60, 71, 50, 46, 63, 42; 29/157 R, 163.5 F; 55/520, 525, 526; 138/40–42; 245/1, 2, 5, 6

[56] References Cited
UNITED STATES PATENTS

| | | | |
|---|---|---|---|
| 2,334,263 | 11/1943 | Hartwell | 55/525 X |
| 2,552,615 | 5/1951 | Baltzer | 181/46 |
| 2,672,214 | 3/1954 | Goodloe | 29/157 R |
| 2,678,637 | 5/1954 | Doeden | 181/36 A UX |
| 2,829,733 | 4/1958 | Bartels et al. | 55/526 |
| 2,907,405 | 10/1959 | Marshall | 181/36 A UX |
| 2,950,775 | 8/1960 | Zwayer | 181/36 A UX |
| 3,163,255 | 12/1964 | Stryker | 181/71 X |
| 3,270,834 | 9/1966 | Bratt | 181/60 X |
| 3,672,465 | 6/1972 | Blatt et al. | 181/71 X |
| 3,690,606 | 9/1972 | Pall | 181/33 G UX |
| 3,712,415 | 1/1973 | Blatt et al. | 181/71 X |

FOREIGN PATENTS OR APPLICATIONS 878,480 10/1961 United Kingdom........... 181/60

OTHER PUBLICATIONS

"Air–Maze Type KK and Twin Muffl–Maze Filter–Silence," Published by Air–Maze Corp., Cleveland, Ohio, 1959.

*Primary Examiner*—John Gonzales
*Attorney, Agent, or Firm*—Milton E. Gilbert

[57] ABSTRACT

The invention consists of provision of novel noise-silencing fluid-discharge devices which provide superior noise reduction. The devices comprise one or more flow-modifying elements which are made by rolling and compacting knitted metal wire mesh fabric. A preferred embodiment of the invention is an air discharge nozzle which is characterized by a high air discharge velocity while simultaneously effecting a sharp reduction in noise.

19 Claims, 8 Drawing Figures

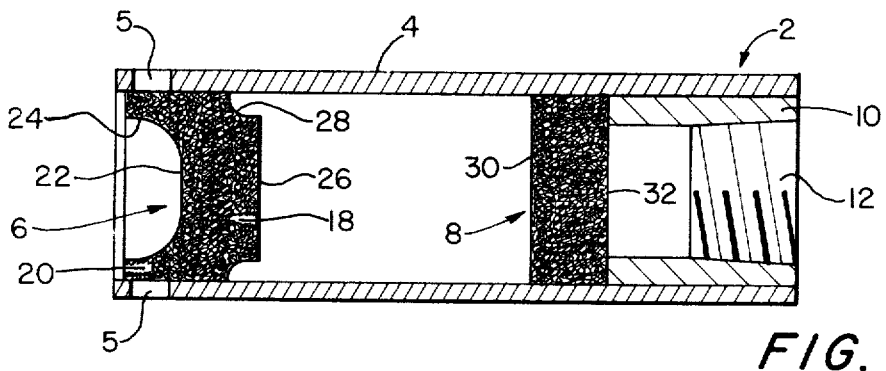
FIG. 1
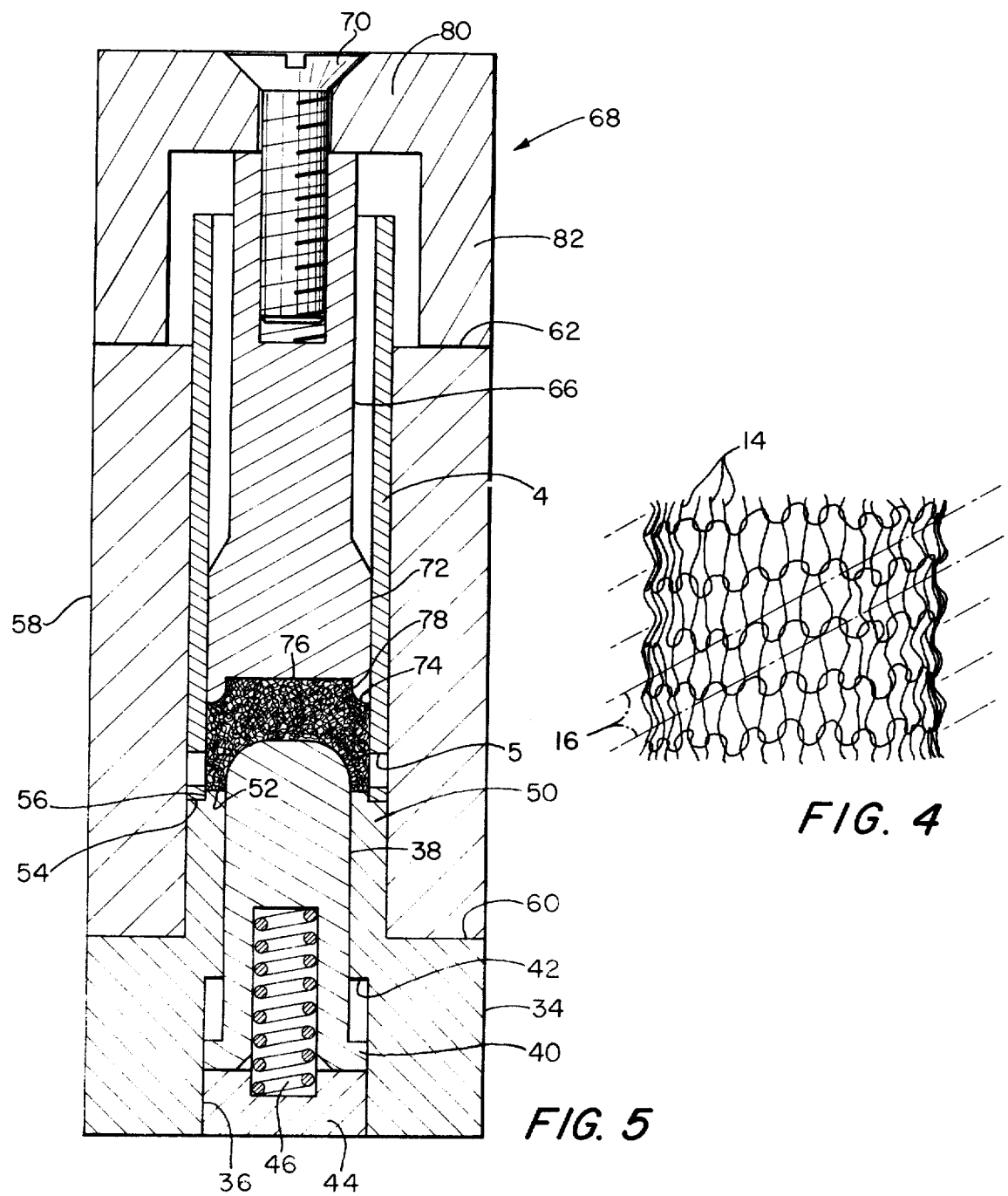
FIG. 4
FIG. 5

3,960,239

NOISE-REDUCING FLUID-FLOW DEVICES

This invention relates to the suppression of noise in fluid flow systems and more particularly to noise silencing fluid discharge devices.

As described more fully hereinafter, the present invention is directed to improved means for suppression of noise in two different types of noise silencing gas discharge devices: (a) devices that discharge gases in a coherent or narrow stream or jet, and (b) devices that discharge gas in a diffused flow pattern. The first class is exemplified by air nozzles of the kind used in machine shops to blow off metal particles and dirt, and air ejectors used for pneumatically handling and conveying, e.g. for ejecting parts and products from forming or conveying means. The second class is exemplified by devices for exhausting or dumping gas under pressure from gas operated apparatus such as air powered presses, tools, cylinders, valves and the like.

As is well known, a very serious problem and drawback of many gas flow systems wherein a compressed gas is discharged or exhausted is the generation of noise. Thus, for example, when compressed air is discharged through a nozzle or rapidly exhausted from an air-powered device such as an air cylinder, a loud usually very shrill noise is produced. Such noise is very disconcerting to personnel in the vicinity of the nozzle or air cylinder, and if a number of such devices are concentrated in one area and operated at different intervals, the sudden changes in noise level creates nearly intolerable working conditions. Thus for both of the aforementioned classes of gas-discharge devices it is desireable to effect noise silencing or suppression in the audible range. In the case of nozzles and air ejectors, however, it is necessary that the means employed for reducing noise not interfere with the seemingly contradictory objective of providing a narrow jet of relatively high discharge velocity. Also in the case of devices for effecting rapid exhausting or dumping of gases in a diffused pattern, the means employed for reducing noise should not create a high back-pressure since that condition tends to restrict the volume of gas that can be exhausted per unit time.

Heretofore many different means have been proposed to reduce or suppress the noise attendant to discharge or flow of compressed gases. Commonly these means include one or more of a variety of sound muffling materials, including but not limited to non-compacted sintered metal powders, sintered metal discs, steel or mineral wool, glass fibers or fabric, foraminous metal plates, and wire gauze or cloth. Prior gas discharge devices incorporating such materials suffer from one or more limitations. For one thing, certain of the sound muffling materials are difficult to work with, or lack structural integrity, or require suitable enclosures to prevent disintegration and efflux upon rapid flow of gas. These prior devices also are handicapped by one or more of the following problems: high cost of manufacture, poor corrosion resistance, poor heat resistance, excessive size, development of unduly large back pressures, and unsatisfactory noise suppression. A particular problem with air discharge nozzles, e.g. nozzles of the type employed in machinery and other manufacturing operations to blow off loose metal particles and dust, is that the sound muffling elements or materials act as flow restrictors and achieve noise suppression at the expense of a reduction in exit velocity. A further problem with such air discharge nozzles is that the noise silencer must not so diffuse the flow of air as to prevent the air from being discharged as a relatively concentrated stream.

Accordingly, the primary object of this invention is to provide new noise silencing gas discharge devices which overcome or substantially reduce many of the above-mentioned limitations of prior known devices.

Another important object of this invention is to provide a novel noise-silencing element for use in fluid discharge devices.

A further object is to provide novel noise-silencing elements and gas discharge devices incorporating the same which achieve noise reduction while simultaneously maintaining a relatively high gas discharge velocity.

A more specific object is to provide a new, simple and improved air discharge nozzle that is characterized by relatively quiet operation and high exit velocity and meets legal safety requirements.

Another object is to provide a new method of making noise-silencing fluid-flow devices.

A further object is to provide an improved noise-silencing gas discharge device that is adapted to discharge a pressurized gas in a diffused pattern and creates a relatively low back pressure.

Still other objects of the invention are to provide a gas flow silencer which is capable of being used effectively in conjunction with air lines, exhaust valves and various types of gas-powered equipment such as air cylinders, is not itself a source of sound producing vibrations, can be made of corrosion and heat resistant material, has a simple and compact construction, is sturdy and easy to install, and can be made at relatively low cost.

In accordance with this invention, the foregoing objects are achieved by providing a noise-silencing airflow device which essentially comprises at least one flow-modifying element which is made by rolling up and compacting knitted metal mesh or fabric. Other features and many of the attendant advantages of the invention will become apparent from the following detailed disclosure and the accompanying drawings, wherein:

FIG. 1 is a longitudinal sectional view of an air nozzle constituting a preferred embodiment of the invention;

FIG. 4 is a diagrammatic view on an enlarged scale of a piece of knitted wire mesh;

FIG. 5 is a longitudinal sectional view of a die used to form the front flow-modifying element of the device of FIG. 1;

In the several figures of the drawings, like numerals are used to designate like parts and elements.

Figure 2:
FIG. 2 is a photographic reproduction, magnified 15 times, of a major portion of the front of a flow-modifying element of an air nozzle embodying the construction of FIG. 1.

Referring now to FIG. 1, the illustrated device is an air discharge nozzle 2 consisting of cylindrical housing 4 that as formed is open at both ends and has a plurality of side ports 5 at its front or discharge end. Disposed in the front end of the housing is a first plug-like flow-modifying element 6. A second plug-like flow-modifying plug element 8 is disposed in the housing in spaced relation to element 6. Further details of elements 6 and 8 are described below. Also disposed in the housing is a bushing 10 that is internally threaded as shown at 12. In the preferred mode of manufacturing the device of FIG. 1, the elements 6 and 8 and bushing 10 are secured in the housing by a friction fit. The elements 6 and 8 are made of a metal material and the housing is made of a metal or plastic material that has a hardness less than the material of which the elements 6 and 8 are made. Preferably bushing 10 is made of metal, e.g., steel or aluminum.

Each of the elements 6 and 8 consists of a compressed mass of metal wire characterized by a closely packed, interlocked wire structure that forms a coherent body. These elements are fabricated from knitted metal wire mesh which may be knitted from round or flat wire or selected gauge. The mesh may be knit flat or tubular and may be of selected mesh loop size. Preferably, it is knitted as a tube or sock on a circular knitting machine. In its simplest form, the knitted wire mesh tube may be knitted from a single continuous length of metal wire which is so manipulated as to form a continuous tube in which successive turns of the wire form lengths which extend circumferentially of the tube and are interlocked by stitches. Each length is bent locally beyond its elastic limit as a result of the formation and interlocking of loops or stitches as the tube is knitted. Thus each circumferential length, in effect, forms a flattened spring which may be stretched or compressed. The finished tube or sock is flattened longitudinally so as to form a two-ply ribbon. Preferably but not necessarily, the flattened tube may be corrugated traversely to provide further interlocking between the lengths of wire in the plies thereof. Corrugating the fabric is known in the art as "crimping" and the product is commonly called "crimped knitted wire mesh fabric". The tube may be corrugated at a right angle to its axial length or at a different angle, e.g. 45°. FIG. 4 presents a side view of a portion of a knitted wire mesh fabric tube as above described. The fabric is seen to comprise circumferential turns of wire 14 with each turn having loops or stitches which are interlocked with adjacent turns. In this case, the fabric is crimped along spaced diagonal lines 16.

Knitted wire mesh fabric and the method of making the same are well known (in this connection see, for example U.S. Pat. Nos. 3,346,302, 2,680,284, 2,869,858 and 2,426,316).

In the practice of this invention, the knitted wire mesh fabric is preferably made of a stainless steel wire, although other steels and alloys may be used.

Preferably the flow-modifying elements 6 and 8 are made by flattening a knitted wire mesh fabric tube upon itself to form a flat 2-ply ribbon, and then rolling the ribbon upon itself. The ribbon is wound up in the manner shown in FIG. 2 of U.S. Pat. 3,346,302, except that it is not wound upon mandrel, with the result that the rolled up body is generally cylindrical instead of being ring-shaped and the width or transverse dimension of the ribbon extends parallel to the body's longitudinal axis. More specifically, the body consists in cross-section of a continuous spiral convolute. In this generally cylindrical body the lengths of wire making up each turn of the fabric tube are now largely so oriented as to extend from one end of the body to the other in directions generally parallel with the body's longitudinal axis.

This cylindrical body is then compressed and molded into a flow-modifying element of desired density and shape. As seen in FIG. 1, the two flow-modifying elements 6 and 8 are both plug-like but have different shapes. The front element 6 is generally cup-shaped, consisting of a main body portion 18 that extends transversely of the housing and an integral cylindrical rim portion 20 that extends across side ports 5 as shown. The front or downstream surface 22 of body portion 18 is generally flat and extends at substantially a right angle to the axis of the housing, but it is concavely curved as shown where it joins with rim 20. The inner surface 24 of rim 20 is generally cylindrical and its end surface is flat and preferably terminates nearly flush but short of the corresponding end surface of the housing. The rear or upstream surface 26 of body portion 18 is flat and extends at substantially a right angle to the axis of the housing. In the illustrated embodiment the rear surface of body portion 18 is formed with a peripheral groove 28. The second or rear element 8 has flat front and rear surfaces 30 and 32 that extend at substantially right angles to the axis of the housing.

Preferably the front flow-modifying element 6 is molded in situ using a die apparatus as shown in FIG. 5. The apparatus consists of a mold assembly and a piston assembly both made of tool steel. The mold assembly comprises a base 34 having an axial bore 36 in which is disposed a slidable mold element 38. Bore 36 is counterbored at its bottom end to slidably accomodate a radial flange 40 on the end of mold element 38. The inner end of the counterbore is flat so as to form an annular shoulder 42 which acts as a stop for flange 40. A plug 44 is press-fitted in the outer end of the counterbore to limit retraction of mold element 38 and also to act as a retainer for a compression spring 46 which urges mold element 38 upward away from plug 44 to the limit determined by engagement of flange 40 with shoulder 42. The upper end of base 34 has a cylindrical extension 50 whose upper end surface 52 is flat but is recessed at its edge to form flat annular and cylindrical surfaces 54 and 56 that together define a peripheral groove. The upper end surface of mold element 38 is flat but has a rounded edge as shown. Interfitted with base 34 is a cylindrical mold sleeve 58 which seats on the flat annular upper surface 60 of the base. The length of mold sleeve 58 is set according to the length of the nozzle housing and its flat upper surface 62 acts as a stop to limit penetration of the piston assembly.

The piston assembly consists of an elongate piston member 66 secured to a piston head 68 by a screw 70. Piston member 66 has an enlarged bottom end characterized by a cylindrical outer surface 72 and a flat bottom end surface 74 which is formed with a coaxial circular recess defined by a flat end surface 76 and a cylindrical side surface 78. The juncture of surfaces 74 and 78 is rounded off as shown. The diameter of cylindrical surface 78 is approximately the same as the outer diameter of the upper end of mold element 38. The diameter of surface 72 is slightly smaller than the inner diameter of nozzle housing 4 and the inner diameter of mold sleeve 58 is slightly greater than the outer diameter of nozzle housing 4. Piston head 68 comprises a circular body 80 with a cylindrical peripheral flange 82 having a flat end surface.

In practice the mold assembly and the piston assembly are mounted in a press (not shown) having a stationary bed and a vertically reciprocal pressure head, with the mold assembly being fixed to the bed and the piston assembly being mounted to the pressure head in vertical alignment with the mold assembly.

The front element 6 is molded by inserting the nozzle housing 4 into mold sleeve 58 so that its flat front end surface bottoms on annular surface 54. Then the cylindrical wire mesh body formed by rolling up the flattened knitted wire mesh fabric tube as described above is inserted into the upper end of housing 4 with the rolled up layers of the tube extending axially of and being compressed radially by the housing, i.e. the cylindrical knitted mesh body is inserted so that its axis of convolution extends parallel to the axis of the nozzle housing. Thereafter the press is operated to lower the piston assembly so that it engages the upper end of the wire mesh body and forces the latter under pressure down into the nozzle housing. The piston assembly is forced downward into the housing far enough for the end of the piston head flange 82 to bottom on the upper end surface 62 of mold sleeve 58. As the piston is forced down, its enlarged bottom end drives the wire mesh body ahead of it. The wire mesh body in turn engages the upper end of mold element 38, causing the latter to retract to the extent determined by engagement of its flange 40 with plug 44. When mold element 38 has bottomed on plug 44, its upper end projects a short distance above the upper annular surface 52 of base 34 whereby to provide the recessed surface 22 and cylindrical rim 20 on the front side of the formed front element 6. The recessed bottom end of the piston assembly causes the rear side of the formed front element 6 to have the flat circular surface 26 and peripheral groove 28. The extent to which the piston assembly penetrates housing 4 and the length and width of the rolled up 2-ply ribbon determines the density of the molded element 6. Accordingly, the axial length of flange 68 is set so that downward movement of the piston assembly is stopped when the rolled up body of wire mesh ribbon has been compressed to a predetermined size and density. Thereafter the piston assembly is withdrawn and flow-modifying element 8 is installed in the nozzle housing via its upstream end.

Flow-modifying element 8 is preformed in much the same manner as element 6. More specifically, element 8 is formed by flattening a knitted wire mesh fabric tube to form a 2-ply ribbon, rolling the ribbon upon itself to form a generally cylindrical body, inserting the rolled up body into a cylindrical cavity formed in a mold block (not shown) having a diameter slightly greater than the internal diameter of housing 4, engaging the rolled up body with a compression plunger (not shown) that is sized so as to make a close sliding fit with the mold cavity and operating the plunger so that it forces and follows the rolled-up wire mesh body into the mold cavity, whereby the wire mesh body engages the bottom of the cavity and is compressed and molded by deformation into a circular plug-shaped element. The compression plunger is inserted far enough into the mold cavity to compress the rolled up body to a predetermined thickness and density. The length of 2-ply ribbon employed in forming element 8 is set so that when the element is formed it has a density which is predetermined percentage of the density of the metal of which the wire mesh fabric is made. The compression plunger is then withdrawn and the formed element is removed from the mold cavity, e.g. by means of an ejector plunger (not shown). The above-described apparatus for forming flow-modifying element 8 is not shown in the drawings since such apparatus is well known to persons skilled in the art. By way of example, the rear element 8 may be molded with apparatus as shown in FIGS. 5–8 of U.S. Pat. No. 2,462,316.

Flow-modifying element 8 is press-fitted into housing 4. This may be achieved by mounting nozzle housing 4 in the mold assembly employed for forming the front element 6, in the manner shown in FIG. 5, and employing therewith a piston assembly (not shown) which is substantially identical to the one shown in FIG. 5 except that its bottom end is flat instead of being recessed. The preformed element 8 is forced into the upstream end of the nozzle housing and is driven into the housing under the driving force of the piston assembly. The extend of penetration of the piston assembly is limited so that the element 8 is driven into a predetermined depth and is spaced a predetermined distance relative to the rear surface of front element 6.

As noted previously, the nozzle housing in the embodiment just described is made of material that is softer than the material of which the elements 6 and 8 are made. Preferably housing 4 is made of aluminum or an aluminum alloy while elements 6 and 8 are made of stainless steel knitted wire mesh. As a consequence as the element 6 is formed in in-situ, portions of the wire of which it is made will abrade and in some places actually cut into the interior surface of the housing, with the result that the element is mechanically interlocked with the housing. Additionally the formed element has a certain amount of spring action and as a consequence it exerts a radial force against the surrounding housing which further improves the mechanical gripping action between the two parts. The connection between the housing and the upstream element 8 is equally strong. The pre-formed element 8 also has a certain spring action. Accordingly by making it slightly oversized it is possible to assure a strong press-fit connection to the housing. Again due to the difference in materials hardness, as the element 8 is forced into the housing portions of the wire of which it is formed will abrade and cut into the interior surface of the housing, so that it is mechanically interlocked with the housing.

The bushing 10 may be made of the same material as the housing or a different material. Thus, for example, if housing 4 is made of aluminum, bushing 10 may be made of aluminum or stainless steel. The bushing may be, and preferably is, secured to the housing by a press-fit. Bushing 10 serves as a means for coupling the nozzle to an air line, and for this purpose it is internally threaded as shown.

Figure 3:
FIG. 3 is a photographic reproduction, magnified 10 times, showing how the same flow-modifying element appears in longitudinal section.

Turning now to FIGS. 2 and 3, as the rolled up or convoluted body of knitted wire mesh fabric is compacted and molded into the element 6 or 8, it is tightly compressed in directions transverse to the width of the flattened tube or ribbon, i.e., it is compressed both radially and axially, with the result that the turns or length of wire are crimped at innumerable points beyond their elastic limits so that they take a more or less permanent set. Additionally as the wire mesh fabric is compressed the wire is so deformed as to produce a compressed mass or body consisting of a very great number of uniformly distributed, randomly directed, relatively short spans or lengths of wire which contact each other at innumerable points within the mass, with the result that these spans or lengths are intimately interlocked substantially uniformly throughout the entire volume of the mass with portions of the spans of wire being spaced to form small pockets and passageways of capillary size. The net result is a relatively dense yet porous cohesive or self-supporting body consisting of fine, intermingled and interconnected spring wire spans and is characterized by substantial structural integrity, controlled density, a uniform and fine porosity, and a controlled spring constant. The multiplicity of short spans of wire, the uniformity of distribution and the directions of such spans, and the innumerable points of contact between them, are all shown in FIGS. 2 and 3. In this connection it is to be noted that FIG. 2 shows only a portion of the rim portion of the front element. Nevertheless, it is to be understood that the internal structure of the cylindrical rim section is substantially the same as the transverse body portion. In practice, however, the element is made so that the rim section has a slightly greater density than the transverse body section. Further in connection with FIG. 3, it is to be noted that the front and rear surfaces of the elements are actually relatively smooth and sections of wire do not project therefrom as shown. The projecting wire sections visible in FIG. 3 are merely the result of disturbance of the spans of wire in the process of sectioning a front element with a mechanical saw.

In the embodiment of FIG. 1, it is desirable that the rim 20 be at least as dense as the remainder of front element 6, for reasons of function and structural integrity as well as appearance. Accordingly to assure good filling of the bottom of the mold cavity (formed by the base and piston assemblies shown in FIG. 5) with wire mesh, so as to produce a rim 20 of suitable density and uniformity, it is preferred to roll up the flattened tube of wire mesh fabric so that the inner turns are displaced axially along the axis of convolution relative to the outer turns, whereby the end of the rolled-up body that is introduced first into the housing 4 is generally concave instead of flat and the opposite end is generally convex. Thus, when the piston assembly is employed to push the rolled-up body into the housing and to deform it into a compact mass as previously described, the end surface 74 of the piston assembly will drive the outer turns of the rolled-up mesh body down between the housing and mold member 38 tightly against the surface 52 of mold assembly base 34. The rounded edge of the upper surface mold member 28 assists in directing wire mesh into the annular space between it and the nozzle housing. The density of the rim section is of less concern if the side ports 5 are omitted, e.g., where the nozzle is to be used for a static application such as in a stationary parts ejector. Ports 5 function as dead-end escape holes, i.e., they perform a safety function in that they prevent build-up of excessive back-pressure in the event the front of the nozzle is blocked off.

Air discharge nozzles as shown in FIG. 1 made in accordance with this invention not only produce coherent air streams at relatively high discharge velocities but also at a greatly reduced audible sound level. They also develop relatively low back pressures. The rim section of the front element acts as a barrier to air flow through ports 5 so that during normal operation little or no air flows outwardly through ports 5. However, when the nozzle is blocked off, air will exit through ports 5 and prevent build-up of back pressure. By way of example, when a nozzle formed as described below and having six evenly spaced ⅛ inch ports 5 is coupled to a 100 psi compressed air supply and its front end is blocked off, the dead-end back pressure will build up to only 4.1 psi. It has been discovered also that if the dish-shaped front-element 6 is replaced with a flat surfaced element like the rear element 8, the noise reduction will be about the same but the discharge velocity will be less. For example, one nozzle made as described above and a second nozzle of the same size and construction as the first except that the front element was flat surfaced, were both coupled by like means to 90 psi air supplies and the discharge velocities of their air streams were measured. The first nozzle with the dish-shaped front element had a discharge velocity of 13,400 feet/minute while the second had a discharge velocity of 10,800 feet/minute. In both cases, however, flow was laminar.

It has been determined also that if the rear element 8 is omitted, the noise generated by the discharge of air is greater and the discharge velocity of the air stream passing through the front element is less than the noise and discharge velocity produced when both elements are present in the nozzle.

It is believed that the upstream element 8 causes the incoming turbulent air to be transformed or modified into a laminar or nearly laminar flow and the downstream element 6 further modifies the air flow with the result that the air exits the nozzle as a coherent highly laminar stream of high velocity. It also is believed that upstream element decreases noise and the downstream element acts to further decrease the noise. In any event it has been determined as follows from testing (1) nozzles with only one element and nozzles with two spaced elements made as described above, and (2) nozzles made using other sound absorbing or muffling materials: (a) there is no direct correlation between back pressure and velocity or between velocity and noise; (b) there is a direct correlation between back pressure and noise, with noise decreasing as back pressure increases; and (c) the back pressure increases with an increase in the density of either the front or rear elements provided in accordance with this invention. With respect to (c) it has been found that a nozzle having two like-shaped spaced elements having the same thickness and density will produce lower back pressure and less noise than will a nozzle of the same size having a single like-shaped element of the same density but twice the thickness.

As an alternative mode of constructing nozzles according to the present invention, the ribbon formed by flattening the knitted wire mesh fabric tube is first folded along fold lines extending transversely of its length (instead of being rolled up as previously described), the folded ribbon is then inserted into the nozzle housing (or mold cavity in the case where the element is pre-formed like rear element 8) with the fold lines running parallel to the axis of the housing, i.e., running lengthwise of the housing, and thereafter it is compressed and molded into the desired shape. It has been found that a nozzle having two elements like that of FIG. 1 but with the elements molded from a folded rather than a rolled-up ribbon will have a noise reduction capability as good as but a discharge velocity that is less than a nozzle of the same design incorporating elements made with rolled-up mesh. Additionally, the nozzle with elements made with a folded rather than a rolled-up wire mesh ribbon will exhibit a substantially higher back pressure. The density and homogeneity or filling of the rim 20 of the front element are inferior to that achieved by molding the front element from rolled-up knitted mesh.

Table I below illustrates the comparative performances of nozzles embodying elements constructed in accordance with the present invention. In each case the nozzle housing was made of aluminum and had a length of 2.25 inches, and i.d. of ⅝ inch, and an o.d. of ¾ inch; the rear element had a thickness of ½ inch, and the front element had a body (18) thickness of ½ inch, a rim thickness of about 3/32 inch, and a rim length measured from the front face 22 of about ⅛ inch. In all cases, the elements were made of stainless steel knitted wire mesh fabric tube made of 0.0045 inch diameter wire with about 9 loops per inch. Whether the nozzle has one or two elements and the density of the formed knitted wire mesh element is indicated in Table I by the type designation, e.g., the type designation 4832 indicates that the front and rear elements 6 and 8 had densities of 48% and 32% respectively, while the type designation 4000 indicates that the nozzle had only one element corresponding to front element 6 and that element had a density of about 40%. The nozzle identified by the asterisk had its elements molded from a folded rather than a rolled-up ribbon. Where two elements were used, the upstream one was spaced about 1⅛ inch from the front element. In all cases the nozzles were supplied with air at a pressure of 100 psi. Where a range of values are given, it is to be understood that a number of like made units were made and tested. The discharge velocities were measured with a pitot tube located coaxially and two inches in front of the discharge end of the nozzle. The noise level was measured with a TYPE 2203 Precision Sound Level Meter made by Bruel and Kjaer of Naerum, Denmark, with the microphonic pickup located two feet away from and coaxial with the nozzle. The term dBA designates the sound level in decibels according to a scale that is weighted to compensate for the fact that the correlation of human auditory response and sound frequency is non-linear.

TABLE I

| No. Type | Noise (dBA) | Discharge Velocity (ft/min) | Back Pressure (psi) |
| --- | --- | --- | --- |
| (1) 3100 | 93 | 7000 | 2.4 |
| (2) 3300 | 91 | 7500 | 3.4 |
| (3) 4000 | 79 | 7600 | 11.5 |
| (4) 4832 | 65.5–66.0 | 14000–16000 | 21.6–22.9 |
| (5) 4832* | 66.5 | 8800 | 18.5 |

Figure 6:
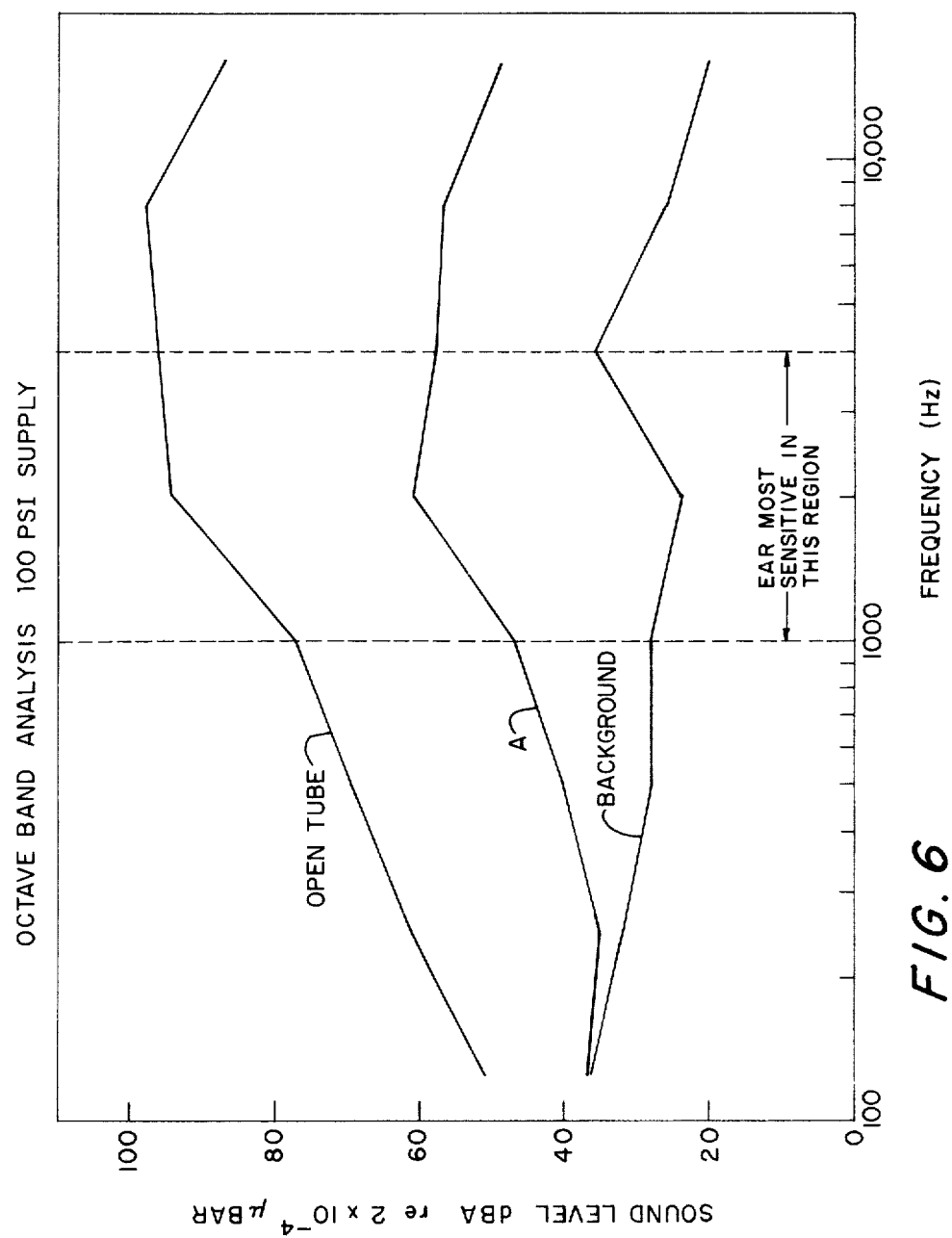
FIG. 6 is a comparison octave band analysis showing the improvement in noise reduction effected by air nozzles constructed in accordance with this invention.

Curve A of FIG. 6 illustrates the performance of nozzle No. 4 of Table I. The curve identified as "Open Tube" shows the noise v. frequency characteristic of the nozzle housing with the two elements omitted. The housing per se connected to a 100 psi supply exhibits a discharge velocity of about 7100 ft./min. and a back pressure of about 2.6 psi. The two vertical broken lines in FIG. 6 demarcate the frequency band in which the human ear is most sensitive.

Nozzles made with elements formed of other muffling materials generate more noise and with some exception, much lower discharge velocities. Surprisingly nozzles with elements made in the manner described above but formed of conventional wire screen or cloth provide substantially less noise reduction and relatively low discharge velocities. For example a nozzle was made with two elements formed of 16 mesh stainless steel wire cloth. The cloth was formed of 0.009 inch diameter wire and had a width of 1 ½ inches. The front element was made by rolling up a selected length of the wire cloth and molding it in-situ to the same shape as element 6 of FIG. 1. It had a thickness of about ¼ inch and a density of about 47%. The rear element was pre-formed and then inserted in the nozzle housing in the same manner as element 8 of FIG. 1. It was made from a selected length of wire cloth and had a thickness of about ¼ inch and a density of about 32.5%. The elements had substantially the same size and shape and were spaced apart about the same distance as the elements of nozzle No. 4 of Table I. When connected to a 100 psi supply, the nozzle had a noise level of 68 dBA, a back pressure of 48 psi, and a velocity of only 2600 ft/min. It is to be noted that the terms "wire screen" and "wire cloth" are synonymous and denote a material consisting of a first series of wires running in one direction and a second series of wires running at right angles to the first, with each wire in the first series alternately passing over and under successive wires of the second series.

Another nozzle with two elements made of the same 16 mesh stainless steel wire cloth but with the elements formed in a different manner indicates that the method of forming the elements affects nozzle performance. In this case the wire cloth was cut into round discs and each element was formed of 20 such discs laid one on top of the other and brazed together at their edges. Each element was about ¼ inch thick and the elements were substantially uncompressed. These elements had about the same diameter and were spaced about the same as the elements of Nozzle No. 4 of Table I. When the nozzle was connected to a 100 psi supply, it produced a noise level of about 76.5 dBA, a back pressure of about 10.2 psi, and a discharge velocity of 11,000 ft/min.

Nozzles with two elements formed of still other materials also have been made and tested, with diverse results. For example, nozzles with elements made of uncompressed very fine wire steel wool (00 grade) exhibit a discharge velocity as high as 14,000 ft/min, but have a noise level of 82.0 dBA. Also the elements are hard to contain and tend to disintegrate. Nozzles made with elements of the same steel wool but compressed to a density of 48% exhibit substantially no air flow (and hence no noise). Nozzles with two ¼ inch thick elements formed of polyurethane open cell foam with a density of 8 pounds/cubic foot exhibit a noise level of 67.5 dBA but a discharge velocity of only about 2600 ft/min. It has been found also that no air flow will result through a nozzle having two ¼ inch thick elements each made of 304 Stainless Steel Felt Metal with a density of 34% or a density of 60%.

Figure 7:
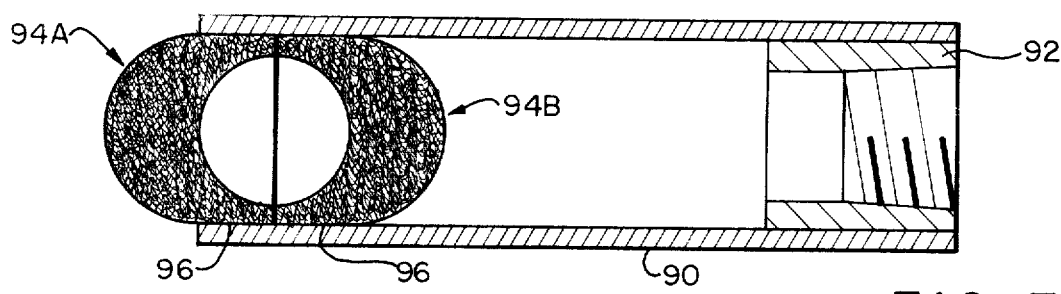
FIG. 7 is a longitudinal sectional view of an air exhausting device embodying the invention.
Figure 8:
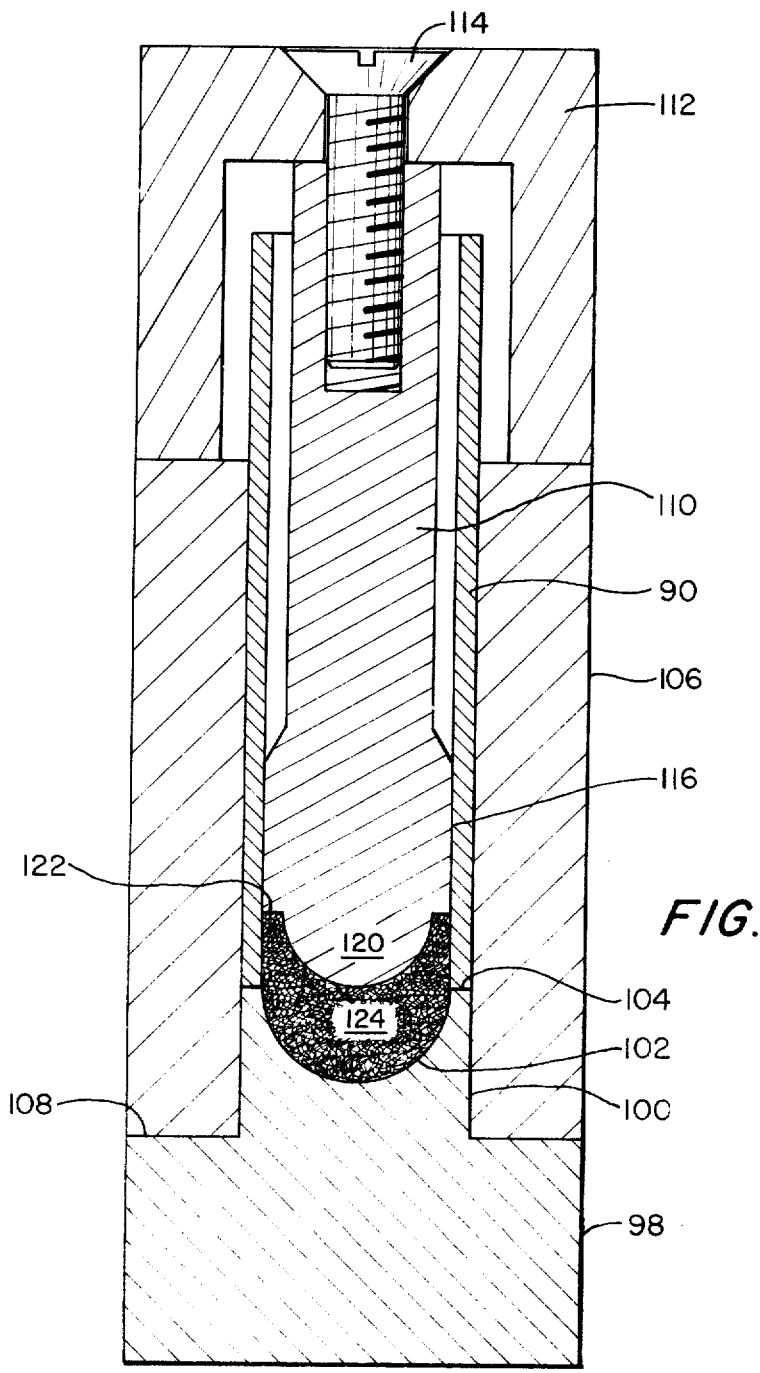
FIG. 8 is a longitudinal sectional view of a die used to form the device of FIG. 7.

Referring now to FIGS. 7 and 8, the present invention also makes possible improved exhaust devices for gas operated equipment such as pneumatic cylinders, air compressors, air valves etc. These improved exhaust devices satisfy the requirements of low noise, low back pressure, and a diffused discharge. The exhaust device shown in FIG. 7 comprises a tubular housing 90 with a threaded bushing 92 press-fitted in one end, whereby the housing can be secured to the exhaust part of a pneumatic device. Mounted in the opposite end of the housing are two flow-modifying elements 94A and 94B which have a generally hemispherical shape but also may be made with a frusto-conical shape like the baffles of the gas exhaust silencer shown in U.S. Pat. No. 3,712,415. The elements 94A and 94B preferably have a greater thickness at their centers as shown and their ends are extended so that the ends of their outer surfaces are substantially cylindrical as shown as 96 to facilitate a good grip with the housing. Preferably but not necessarily the front or end element 94A is formed in-situ and the rear element 94B is pre-formed and inserted after element 94A is formed. However, both of the elements may be pre-formed and press-fitted into place.

Both elements are formed by compacting a body of knitted wire mesh fabric using a forming die in essentially the same manner as the elements 6 and 8 of FIG. 1 are formed. Preferably the body of knitted wire fabric is prepared for compaction by rolling up a flattened knitted wire mesh tube, but it also can be made by folding the flattened tube and inserting it in the housing (or the die cavity in the case of preforming the element) with the fold lines running parallel to the axis of the housing.

FIG. 8 shows a forming die assembly forming the element 94A in-situ. The forming die assembly comprises a stationary die 98 of circular cross-section having a cylindrical extension 100 at its top end. The upper surface of extension 100 is formed with a generally concave cavity 102 and has a flat annular surface 104 surrounding the upper end of the cavity. A die sleeve 106 made of tool steel fits down over extension 100 and seats on the flat upper surface 108 of die 98. The die assembly also comprises a piston unit consisting of an elongate piston 110 and a piston head 112 secured to the piston by a screw 114. The bottom end of piston 110 is enlarged and has a cylindrical outer surface 116 sized to make a close sliding fit with the inside of housing 90 and a hemispherical extension 120. A flat annular surface 122 surrounds extension 120. In forming the front element in-situ, the housing 90 is inserted into sleeve 106 so that it rests on annular surface 104. Then the rolled-up or folded knitted wire mesh fabric is inserted into the upper end of the housing and the piston unit is operated to drive the fabric body into the housing. The fabric body is compressed and molded by the compressive co-action of die 98 and the end of the piston unit. The extent of penetration of the piston unit determines the final shape of the mass 124 of knitted wire mesh fabric, and preferably the piston unit is stopped in the position shown in FIG. 8 so that the outer surface of the formed element has a cylindrical extension as shown which engages and makes a friction fit with the inside surface of the housing. The formed element and housing are tightly gripped together and the element is self-supporting and has excellent structural integrity. The internal structure of the element is essentially the same as that described above with respect to elements 6 and 8. It has been determined that the appearance of the element is improved if the knitted fabric is rolled up instead of being folded. However, the performance characteristics are substantially the same with both modes of forming the elements.

By way of example two exhaust devices were made using the same stainless steel wire mesh material employed in Nozzle No. 4 of Table I. For forming the elements of one exhaust device the 2-ply knitted wire mesh ribbon was rolled up on itself. For the elements of the other device, the ribbon was folded upon itself. The housings in which the two pairs of elements were mounted as shown in FIG. 7 had an internal diameter of ⅜ inch. The front element of each device was formed in-situ and the rear element was preformed and press-fitted into place. The elements each had a density of about 28% and a maximum thickness at the center, i.e. along the axis of the housing, of about ⅜ inch. Each device was coupled to a 100 psi air supply. The one whose elements were made from folded ribbon had a noise level of 78.5 dBA and a back pressure of about 4.8 psi. The one whose elements were made with the rolled-up ribbon had a noise level of 78.0 dBA and a back pressure of about 5.1 psi. The latter device had better looking, i.e. more homogeneous, elements which also were found to make a superior mechanical connection with the housing.

Although the preferred embodiments of the invention herein described comprise flow-modifying elements made of a 2-ply ribbon of knitted wire mesh fabric, it is to be understood that a single ply ribbon may also be used. Also, more than two plies can be wound up or folded to form a body which is molded by compaction into a suitable flow-modifying element. Further knitted fabric having more or less than 9.0 loops/inch may be used. With respect to the nozzle of FIG. 1, the spacing between the two elements is determined empirically according to the thickness of the elements and the i.d. of the housing, the optimum spacing being that which provides the best balance of sound muffling and discharge velocity. However, since an important function of the upstream element is to cause the flow of air to assume a laminar or nearly laminar condition, the elements must not be spaced so far apart as to permit the flow between them to become turbulent again. In the case of an exhausting device such as that shown in FIG. 7, it is preferred but not necessary that the two elements be contiguous or nearly so.

It also is contemplated that more than two flow-modifying elements may be installed in the housing of the air discharge device, with the spacing of the elements adjusted so as to provide optimum performance with respect to noise silencing, discharge velocity and back pressure. In this connection it is to be noted that the densities of the flow-modifying elements also may be varied to optimize performance. A number of different materials also may be used to make the housing and flow-modifying elements; by way of example, the housings may be made of a suitable synthetic plastic such as polypropylene or an epoxy resin, while the knitted fabric used to fabricate the flow-modifying elements may be made of an aluminum or a nickel-chronium alloy. Of course, the flow-modifying elements need not be formed in-situ or held in place solely by a friction fit. Thus, for example, one skilled in the art may consider cementing, welding or brazing to secure the flow-modifying elements to the housings. Another possible way of securing the flow-modifying elements in place is by means of retaining rings. Still other means will be obvious to persons skilled in the art. It also is contemplated that the knitted fabric may be knitted from a multiple strand wire, e.g., from two wire strands twisted together to form a single wire. Still other modifications will be obvious to persons skilled in the art. Finally, it is recognized that the present invention is not limited to gas flow devices and may be used to provide noise-silencing liquid flow devices. Accordingly, in the following claims the term "fluid" is to be construed as embracing both gases and liquids.

What is claimed is:

1. A noise-reducing fluid flow device comprising an elongate housing having an inlet at one end thereof, an outlet at an opposite end thereof, and a passageway for carrying a stream of pressurized fluid from said inlet to said outlet, said one end being adapted for connecting said inlet to a source of pressurized fluid and said outlet being open to the atmosphere exterior of said housing; and a noise-silencing element for reducing the noise level of said stream of pressurized fluid passing out of said passageway via said outlet, said noise-silencing element being positioned wholly within said housing and extending fuly across said passageway at said outlet, at least a portion of said passageway commencing at the upstream side of said noise-silencing element and extending toward said inlet being unobstructed to flow of pressurized fluid, said noise-silencing element being frictionally gripped by the internal surface of said housing and being made of a knitted metal wire mesh fabric that has been rolled up and compressed and molded into a self-supporting, dense, porous mass with the wire threads of said fabric intermingled and forming a myriad of relatively short length spring wire spans that are oriented randomly in said mass, said fabric being made of metal wire with a substantially round cross-section.
   said housing being made of a material with a hardness less than that of the metal wire threads of said wire mesh fabric;

2. A noise-reducing fluid flow device comprising a housing having an inlet and an outlet and a passageway for carrying a pressurized fluid from said inlet to said outlet, and a pair of mutually spaced noise-reducing elements positioned within said housing and extending fully across said passageway between said inlet and outlet with the space between said noise-reducing elements being unobstructed, each of said noise-reducing elements being made of a knitted metal wire mesh fabric that has been convoluted and compressed and molded into a self-supporting, dense, porous mass consisting of a multiplicity of relatively short spring wire spans which are substantially uniformly distributed and randomly directed and contact each other at a multiplicity of points within the mass, one of said noise-reducing elements being located at said outlet and having an inwardly curved surface extending across said passageway, said inwardly curved surface being exposed to the atmosphere exterior of said housing.

3. A method of producing a gas silencer device comprising:
   forming a noise-silencing element by convoluting a ribbon of knitted metal wire mesh fabric so as to form a body characterized by a plurality of adjacent layers, and compressing said body in a direction extending transversely of the length of said ribbon so as to form a dense, porous element, and
   securing said element in an elongate passageway in a housing having an inlet and outlet for said passageway so that said element extends fully across said passageway, said housing being made of a material with a hardness less than that of the metal wire threads of said fabric and said element being secured in said passageway by forcing portions of the wire threads of said element into abrading and mechanically interlocking engagement with said housing.

4. The method of claim 3 wherein said element is formed in situ in said passageway and said element is secured in said passageway contemporaneously with its formation.

5. The method of claim 3 wherein said element is formed outside of said housing and is secured by press-fitting it into said passageway.

6. The method of claim 3 comprising forming a second, dense, porous element in the same manner as said first-mentioned element, and securing said second element in said passageway so that it extends fully across said passageway and is spaced from said first-mentioned element.

7. The method of claim 6 wherein said first-mentioned element is formed in situ in said passageway and said second element is formed outside of said housing and is secured by press-fitting it into said passageway.

8. A method according to claim 3 wherein said ribbon is convoluted by rolling it upon itself.

9. A method according to claim 3 wherein said ribbon is convoluted by folding it upon itself.

10. A noise-reducing fluid flow device comprising a housing defining a passageway for carrying a pressurized fluid stream, and a noise-silencing element positioned within and extending fully across said passageway, said noise-silencing element being made of a knitted metal wire mesh fabric that has been rolled up and compressed and molded intno a self-supporting, dense, porous mass, said noise-silencing element comprising a first body section having a concave end surface and a second tubular rim section formed integral with and extending away from the peripheral portion of said concave end surface, and further including a plurality of ports in said housing communicating with said rim section.

11. A device according to claim 10 comprising a second noise-silencing element positioned within and extending fully across said passageway, said second noise-silencing element being spaced from the said body section of said first-mentioned noise-silencing element.

12. A noise-reducing fluid flow device comprising a housing defining a passageway for carrying a pressurized fluid stream, and a noise-silencing element positioned within and extending fully across said passageway, said noise-silencing element being made of a knitted metal wire mesh fabric that has been rolled up and compressed and molded into a self-supporting, dense, porous mass, said housing being made of a material with a hardness less than that of the metal wire threads of said wire mesh fabric and said noise-silencing element being frictionally gripped by the internal surface of said housing.

13. A device according to claim 12 wherein said noise-silencing element has a concave surface at one end and a convex surface at the opposite end.

14. A device according to claim 12 comprising a second noise-silencing element axially aligned with said first-mentioned element along said passageway, said noise-silencing elements having curved surfaces extending across said passageway and mutually contiguous edge portions.

15. A device according to claim 14 wherein said noise-silencing elements each have a convex surface on one side and a concave surface on the opposite side, said elements being oriented so that their convex surfaces face away from one another.

16. A device according to claim 12 comprising a second noise-silencing element positioned within an extending fully across said passageway, said second noise-silencing element being spaced from said first-mentioned noise-silencing element, said second noise-silencing element also being made of a knitted metal wire mesh fabric that has been rolled up and compressed and molded into a self-supporting, dense, porous mass.

17. A device according to claim 16 wherein said second noise-silencing element is frictionally gripped by the internal surface of said housing.

18. A noise-reducing fluid flow device comprising a housing having an inlet and an outlet and a passageway for carrying a pressurized fluid from said inlet to said outlet, and a pair of mutually spaced noise- reducing elements positioned within said housing and extending fully across said passageway between said inlet and outlet with the space between said noise- reducing elements being unobstructed, one of said noise-reducing elements being located at said outlet and comprising a first body section having a concave end surface and a second tubular rim section formed integral with and extending away from the peripheral portion of said concave end surface, said concave end surface being exposed directly to the atmosphere exterior of said housing, each of said noise-reducing elements being made of a knitted metal wire mesh fabric that has been convoluted and compressed and molded into a self-supporting, dense, porous mass consisting of a multiplicity of relatively short spring wire spans which are substantially uniformly distributed and randomly directed and contact each other at a multiplicity of points within the mass.

19. A noise-reducing fluid flow device comprising a housing having an inlet and an outlet and a passageway for carrying a pressurized fluid from said inlet to said outlet, said inlet being adapted for connection to a supply of fluid under pressure, and a pair of mutually spaced noise-reducing elements positioned within said housing and extending fully across said passageway between said inlet and outlet with the space between said noise-silencing elements being unobstructed, one of said noise-reducing elements being located at said outlet, each of said noise-silencing elements being made of a knitted metal wire mesh fabric that has been convoluted and compressed and molded into a self-supporting, dense, porous mass consisting of a multiplicity of relatively short spring wire spans which are substantially uniformly distributed and randomly directed and contact each other at a multiplicity of points within the mass, said one noise-silencing element having a peripheral portion engaging the internal surface of said housing, and said housing having at least one side port extending through said internal surface and directed at and communicating with said peripheral portion, whereby to permit escape of fluid from said housing via said at least one port when said outlet is blocked off.

* * * * *